(12) United States Patent
Poynor (10) Patent No.: US 6,859,812 B1
(45) Date of Patent: Feb. 22, 2005

(54) SYSTEM AND METHOD FOR DIFFERENTIATING PRIVATE AND SHARED FILES WITHIN A COMPUTER CLUSTER

(75) Inventor: Todd Allan Poynor, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 10/000,663

(22) Filed: Oct. 31, 2001

(51) Int. Cl.[7] .............................................. G06F 17/30
(52) U.S. Cl. ...................... 707/203; 707/200; 707/201; 707/202; 707/204; 707/205; 707/8; 707/101
(58) Field of Search ........................... 707/8, 101, 200, 707/201, 202, 203, 204, 205, 3; 711/153, 114; 713/2

(56) References Cited

U.S. PATENT DOCUMENTS

| | | | | |
|---|---|---|---|---|
| 5,251,315 A | * | 10/1993 | Wang ............................. | 707/8 |
| 5,313,646 A | * | 5/1994 | Hendricks et al. .......... | 707/101 |
| 5,551,028 A | * | 8/1996 | Voll et al. ................. | 707/103 R |
| 5,566,321 A | * | 10/1996 | Pase et al. .................. | 711/153 |
| 5,706,510 A | * | 1/1998 | Burgoon ...................... | 707/203 |
| 6,151,659 A | * | 11/2000 | Solomon et al. ............. | 711/114 |
| 6,385,722 B1 | * | 5/2002 | Connelly et al. .............. | 713/2 |
| 6,618,736 B1 | * | 9/2003 | Menage ...................... | 707/204 |

OTHER PUBLICATIONS

Pomeroy et al., "Private desktops and shared store", IEEE, 1998, pp. 190–200.*
Lakshmanan et al., "A Secure and highly available distributed store for meeting diverse data", IEEE, 2001, pp. 251–260.*
Sutherland et al., "Peer–to–peer enterprise storage", US Patent Application Publication, 8–2002, pp. 1–19.*
Schmidt, "Method and apparatus for virtual namespaces for active computing environments", US Patent Application Publication, 7–2002, pp. 1–23.*

* cited by examiner

Primary Examiner—Thuy N. Pardo
(74) Attorney, Agent, or Firm—Lloyd E. Dakin, Jr.

(57) ABSTRACT

A system and method for differentiating private and shared files is disclosed. The invention includes the steps of: receiving a request from a computer for access to a shared file; providing the computer with access to a computer specific private copy of the shared file, if the private copy already exists; and creating the computer specific private copy of the shared file for the computer to access, if the private copy does not already exist and if write access to the shared file is requested.

24 Claims, 5 Drawing Sheets

SYSTEM AND METHOD FOR DIFFERENTIATING PRIVATE AND SHARED FILES WITHIN A COMPUTER CLUSTER

BACKGROUND OF THE INVENTION

1. Field of the Invention

The present invention relates generally to systems and methods for file management, and more particularly for differentiating private and shared files within a computer cluster.

2. Discussion of Background Art

Networked computers that share processing tasks are often called clustered computers. Clustering computers allows such computers to function together as a united functional unit for increased fault tolerance, processing power, and ease of system management.

Since clustered computers share computational processing tasks, they also execute many of the same application programs and may share a common storage resource. Two of the most common topologies for shared storage are Network-Attached Storage (NAS) and Storage Area Network (SAN) topologies.

Such common application programs often consume a substantial amount of disk space on their host computers; and, since running multiple instances of such application programs requires that each application program file be copied to each host computer, many file redundancies result across the cluster. Such file duplication also consumes a substantial amount of network bandwidth and administrative effort each time a new cluster computer is brought into the network or a new application program package is installed on each member of the cluster.

One solution, such as used by Hewlett-Packard Company's "Open Software Distributor" product, is to explicitly identify which files can be shared between cluster computers and which should remain private to each instantiation within the cluster prior to application program installation in each host computer. In this approach, a software developer manually and laboriously tags each application file with either a shared or private descriptor.

Another approach, such as used within Red Hat Corporation's "Package Manager" product, is to perform the explicit identification during installation. In this approach, a systems administrator also must manually and laboriously tag each application file with either a shared or private descriptor.

Either approach results in host computer installation images separated into sharable and private file system hierarchies, typically resulting in only one copy of each shared file and multiple copies of each private file.

The effort required of either the software developer or the systems administrator in these approaches, however greatly increases the overhead and debugging associated with each and every cluster application.

Even further, such approaches prevent computer resources from being quickly reallocated among a set of network applications, without either requiring host computers to store on-disk application programs which may never or rarely be used, or by consuming a substantial amount of network bandwidth should copies of the application programs need to be made, as host computers are brought on-line for load balancing or after maintenance.

Furthermore, products such as Hewlett-Packard Company's diskless UNIX employ file management protocols which typically cause the private files to be hidden from normal file access procedures, instead requiring special access methods. These protocols also present many special cases for utilities that access or manage the file system hierarchy.

In response to the concerns discussed above, what is needed is a system and method for differentiating private files from shared files within a computer cluster that overcomes the problems of the prior art.

SUMMARY OF THE INVENTION

The present invention is a system and method for file differentiation. The methods of the present invention includes the steps of: receiving a request from a computer for access to a shared file; providing the computer with access to a computer specific private copy of the shared file, if the private copy already exists; and creating the computer specific private copy of the shared file for the computer to access, if the private copy does not already exist and if write access to the shared file is requested.

The methods also in alternate embodiments may include the steps of: providing the computer with access to the shared file, if the private copy does not already exist and if read access to the shared file is requested; and providing the computer with access to the shared file, if the private copy does not already exist and if execute access to the shared file is requested.

The methods may also include: attributing a Copy-on-Write (CoW) property to the shared file; and creating the computer specific private copy of the shared file for the computer to access, if CoW property is set to an affirmative state. As well as, attributing a private-copy-made property to the shared file; searching for the computer specific private copy of the shared file in a private file area reserved for the computer, if the private-copy-made property is set to an affirmative state; and skipping the searching step if the private-copy-made property is set to a negative state.

The system and method of the present invention are particularly advantageous over the prior art because explicit and/or manual techniques for file differentiation, used in the prior art, are no longer required.

These and other aspects of the invention will be recognized by those skilled in the art upon review of the detailed description, drawings, and claims set forth below.

DETAILED DESCRIPTION OF THE PREFERRED EMBODIMENT

Figure 1:
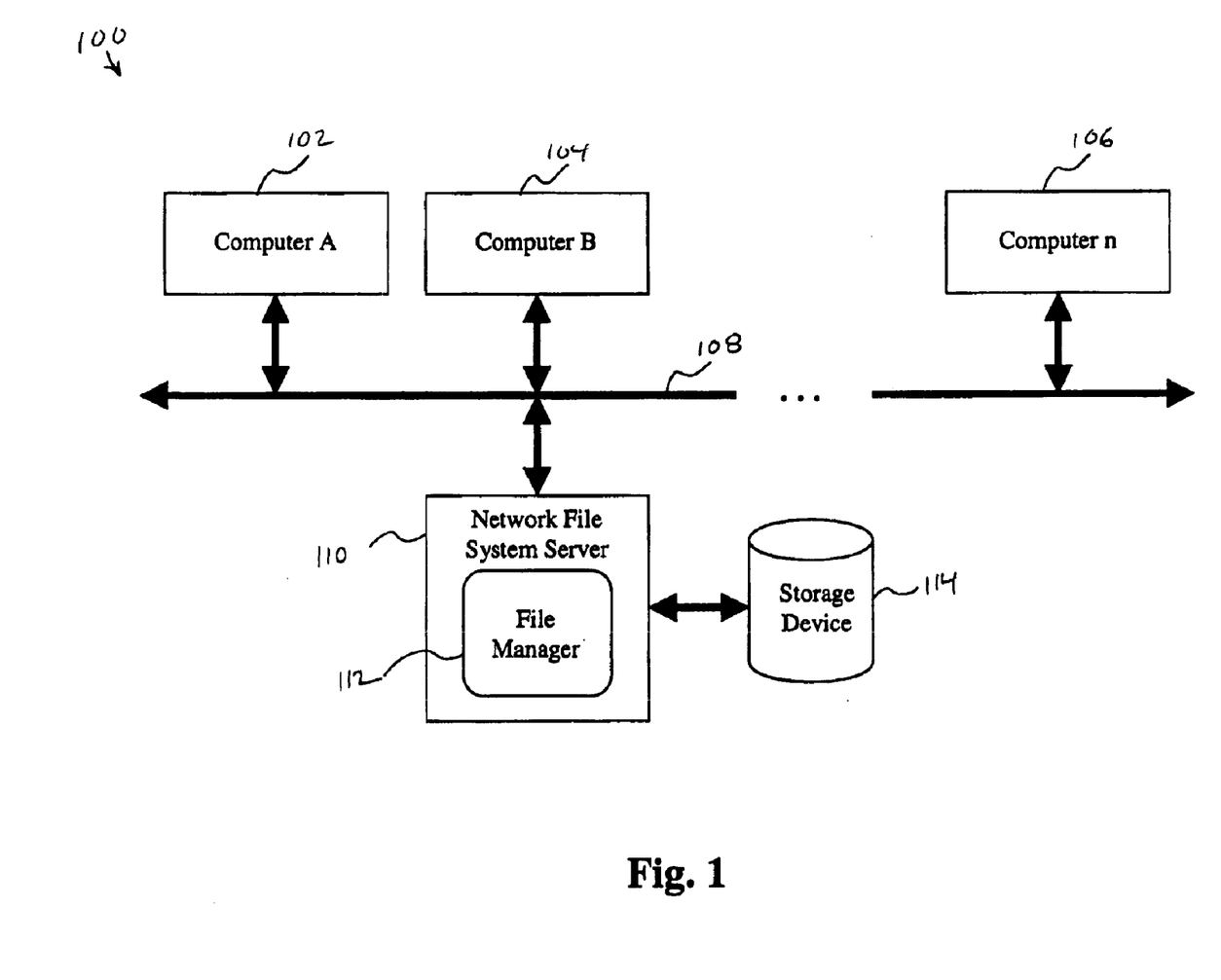
FIG. 1 is a block diagram of a system for differentiating private and shared files within a computer cluster.

FIG. 1 is a block diagram of a system 100 for differentiating private and shared files within a computer cluster. Computer-A 102, computer-B 104, through computer-n 106 are connected by network 108 and together make up the computer cluster. A network file system server 110, containing a file manager software module 112, is also connected to the network 108. A storage device 114 is independently connected to the network file system server 110. This system 100 hardware configuration is called a Network-Attached Storage (NAS) system, however, those skilled in the art will recognize that the present invention works equally well if embodied within a Storage Area Network (SAN) system.

The storage device 114 is a repository for all files need by the computer cluster, including a variety of application programs which each of the computers 102–106 may run in support of computation functions within the cluster. File storage, organization, and retrieval within the storage device 114 is controlled by the file manager 112.

Figure 2:
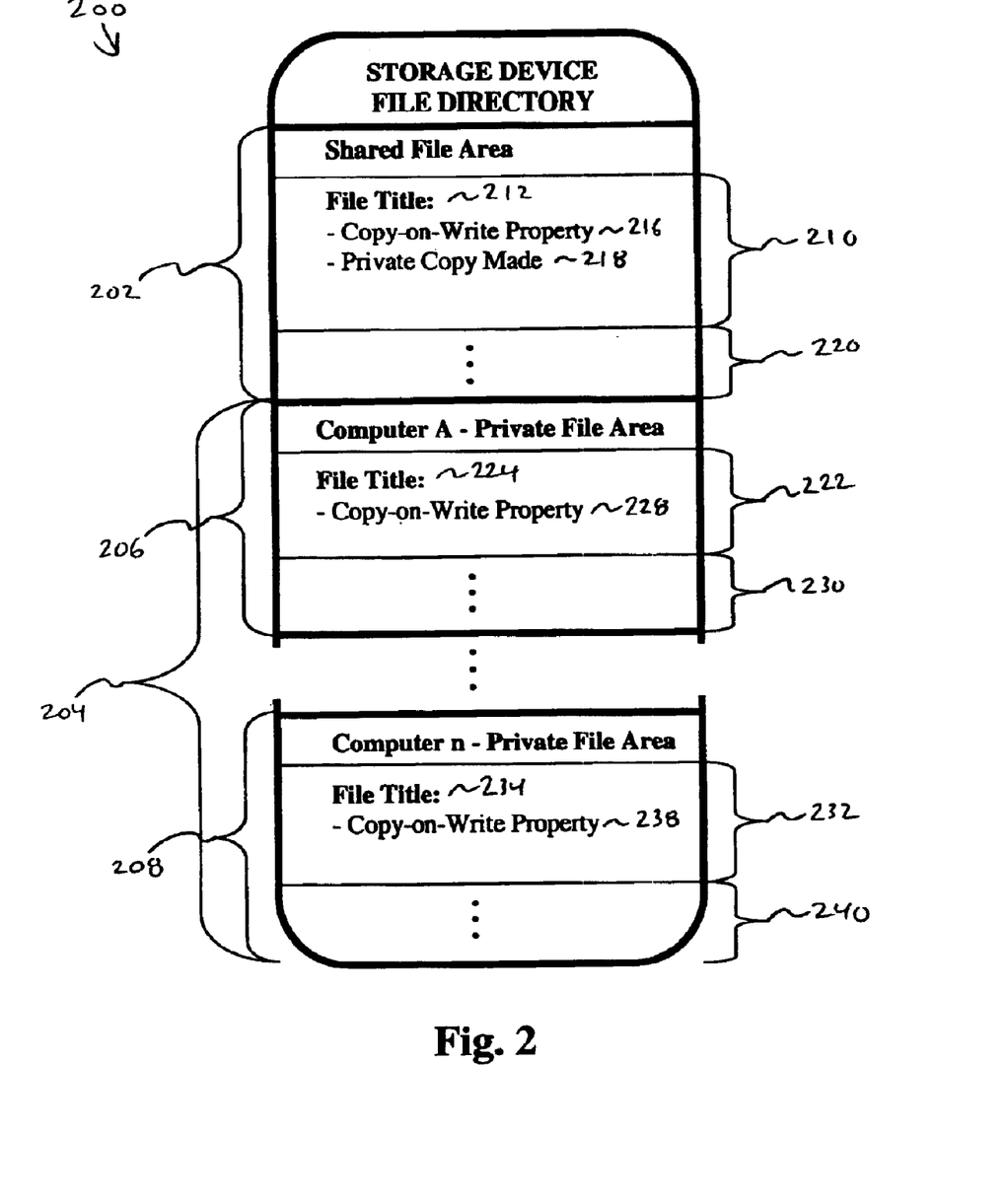
FIG. 2 is a block diagram of a file directory within the system.

FIG. 2 is a block diagram of a storage device 114 file directory 200 within the system 100. The file directory 200 is partitioned into a shared file area 202, and a private file 204 area reserved for the cluster computers 102–106 on an as needed basis. The private file area 204 includes a computer-A private file area 206 on through a computer-n private file area 206, where "n" is any number.

The shared file area 202 includes any number of files having any number of associated fields. A first file 210, within the shared file area 202, includes a file tide field 212, a Copy-on-Write (CoW) field 216, and a private copy made field 218.

Copy-on-Write (CoW) refers to a technique for maximizing sharing of read-only resources and thus minimizing copying of such resources. The technique typically involves initially maintaining only a single shared file, which is accessible to multiple instances of an application and/or by several computers. No copy of the shared file is made until a request to write to the shared file is received from a computer or instance of an application. After such a request, a duplicate copy of the shared file is made, after which only the requesting computer or application is given write authority to the duplicated file. By copying the shared file only when a write request is received, processing overhead and memory or disk requirements are conserved.

All subsequent files 220 within the shared file area 202 also include at least fields 212–218. The CoW field 216 is set to either an affirmative state, such as "yes" or to a negative state, such as "no," indicating to the file manager 112 whether to copy the file 212 in response to a write or update request by one of the cluster computers 102–106, or any other device on the network 108. For the purposes of this specification and associated claims, write and update requests are synonymous in that they refer to an ability to modify a file. The private copy made field 218 is also set to either an affirmative or a negative state, indicating to the file manager 112 whether the file 212 has been copied one or more times into the private file area 204.

The computer-A private file area 206 within the private file area 204 also includes any number of files having any number of associated fields. A first computer-A file 222, within the computer-A private file area 206, includes a file title field 224, and a CoW field 228. All subsequent files 230 within the computer-A private file area 206 also include at least fields 224–228. The CoW field 228 is also a Boolean field set to either "yes" or "no," indicating to the file manager 112 whether to copy the file 212 in response to a write or update request by one of the cluster computers 102–106, or any other device on the network 108.

Similarly, the computer-n private file area 208 within the private file area 204 also includes a first computer-A file 232 having a file title field 234, and a CoW field 238. All subsequent files 240 within the computer-n private file area 208 also include at least fields 234–238.

Figure 3A:
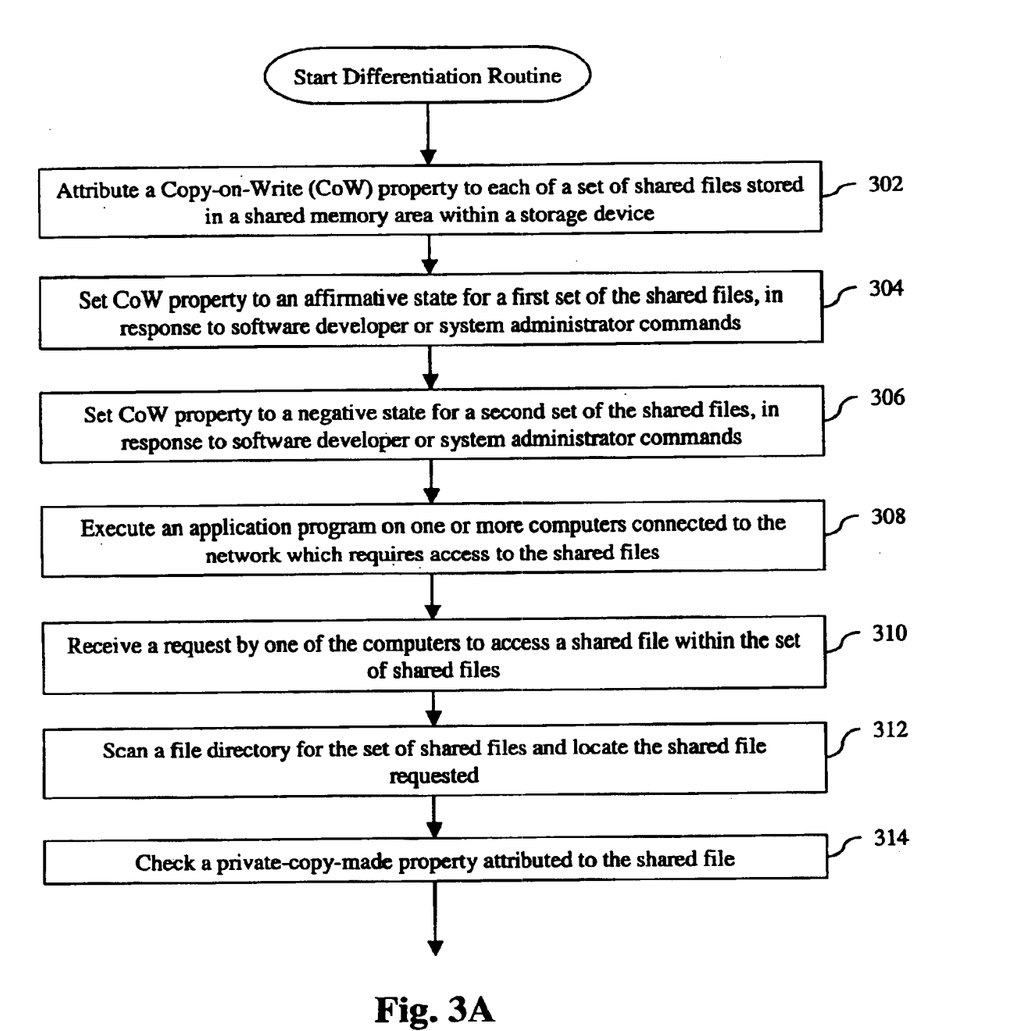
FIGS. 3A and 3B are a flowchart of a method for differentiating private and shared files within a computer cluster.
Figure 3B:
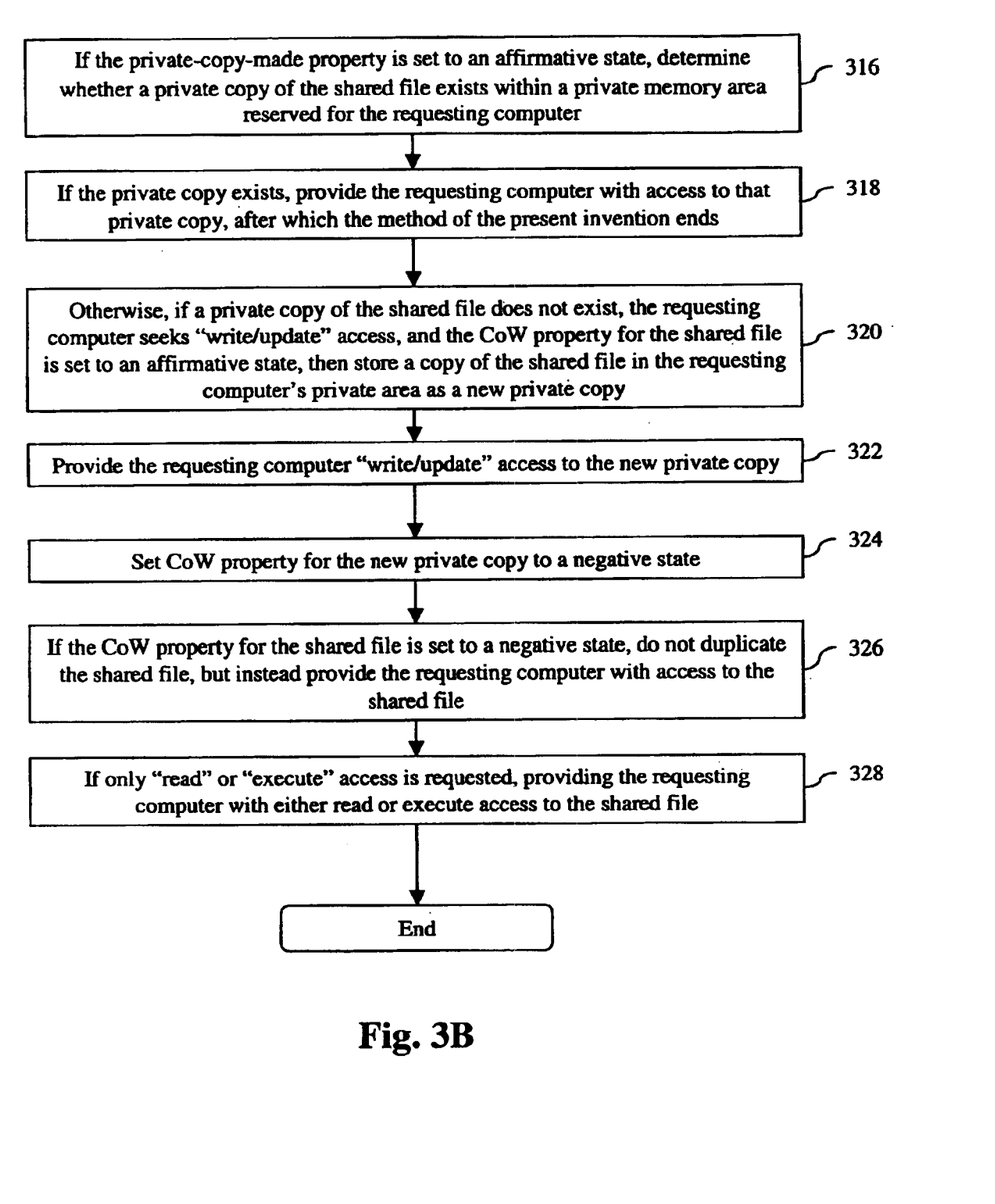

FIGS. 3A and 3B are together a flowchart of a method 300 for differentiating private and shared files within a computer cluster, computer system, or even within a single computer. The method 300 begins in step 302 where the file manager 112 attributes a Copy-on-Write (CoW) property to each of a set of application program files stored in the shared file area 202 within the storage device 114.

The file manager 112 creates the new CoW property by modifying a network file storage protocol used by the storage device and adding the CoW property to each file associated with each application program within the storage device 114.

Next in step 304, the file manager 112, in response to software developer or systems administrator commands, sets the CoW property to an affirmative state for a first set of files in the shared file area 202 of the storage device 114. In step 306, the file manager 112, also in response to software developer or systems administrator commands, sets the CoW property to a negative state for a second set of files in the shared file area 202 of the storage device 114. Those skilled in the art will recognize that the affirmative and negative states of a file property can, in alternate embodiments, be replaced with many other arbitrary designators, including: yes/no; 1/0, etc. etc.

For most application programs, the CoW property is preferably set to a default affirmative state, under an assumption that most writes/updates to a file are meant to be specific and relevant only to the computer requesting write/update access. However, in certain instances a software developer and/or system administrator may set the CoW property to a negative state, based upon a particular usage of the application program.

In step 308 an application program associated with the shared file area 202 files is executed on one or more of the computers 102–106 connected to the network 108. Next, in step 310, the file manager 112 receives a request from one of the computers for access to a shared file within the shared file area 202.

In step 312, the file manager 112 scans the file directory 200 for the shared file area 202 in the storage device 114 in order to locate the shared file requested. Upon locating the shared file, the file manager 112, in step 314, checks the private-copy-made property of the shared file. If the private-copy-made property is set to an affirmative state, indicating that a private copy of the shared file already exists somewhere in the private file area 204 of the storage device 114, the file manager 112, in step 316, determines whether a private file, specific to the requesting computer, already exists within the requesting computer's private file area, namely one of the computer specific private file areas 206 through 208. If a private copy of the shared file is found within the requesting computer's private file area, then the file manager 112, in step 318, provides the requesting computer with access to that private copy, after which the method of the present invention ends. Those skilled in the art recognize that various other methods can also be used to determine whether a private copy of the shared file exists for the requesting computer.

Otherwise, if a private copy of the shared file does not exist, the requesting computer seeks "write/update" access, and the CoW property for the shared file is set to an affirmative state, then in step 320, the file manager 112 stores a visible computer specific private copy of the shared file in the requesting computer's private file area. In step 322, the file manager 112 provides the requesting computer with "write/update" access to the computer specific private copy.

In step 324, the file manager 112 sets the CoW property for the computer specific private copy to a negative state to prevent further duplication.

As an inventor is his/her own lexicographer, this specification here clarifies that use of the phrase "a private copy of the shared file" is meant to specify, in a logically consistent way, that while all computers in the cluster/network can request access to one or more of the shared files, the file manager 112 preferably does not grant such access if the requesting computer seeks write access to the shared file and the CoW property for the shared file is set to an affirmative state. In such a case, a copy of the shared file is made and the file manager 112 sets attributes for the copy such that preferably only the requesting computer may access the copy. This copy is called a private copy, and is thus "a private copy of the shared file."

If the CoW property for the shared file is set to a negative state, then, in step 326, the file manager 112 does not duplicate the shared file, but instead provides the requesting computer with access to the shared file stored in the shared file area 202 of the storage device 114. In step 328, if only "read" or "execute" access is requested, the file manager 112 provides the requesting computer with read or execute access to the shared file from the shared file area 202 of the storage device.

Some types of application files are likely to remain solely within the shared file area 202 and while others are likely to have copies made and stored within the private file area 204. Configuration files, such as those modified by an administrator, may or may not be sharable, depending upon whether a same configuration applies to multiple computers within a cluster. Log files are mostly intended to record computer specific activity, such as those having entries for each remote connection made with other cluster computers, and thus most likely cannot be shared between the cluster computers. Executable files however, such as those of an application program, can almost always be shared, since they are never modified during normal network operation.

Figure 4:
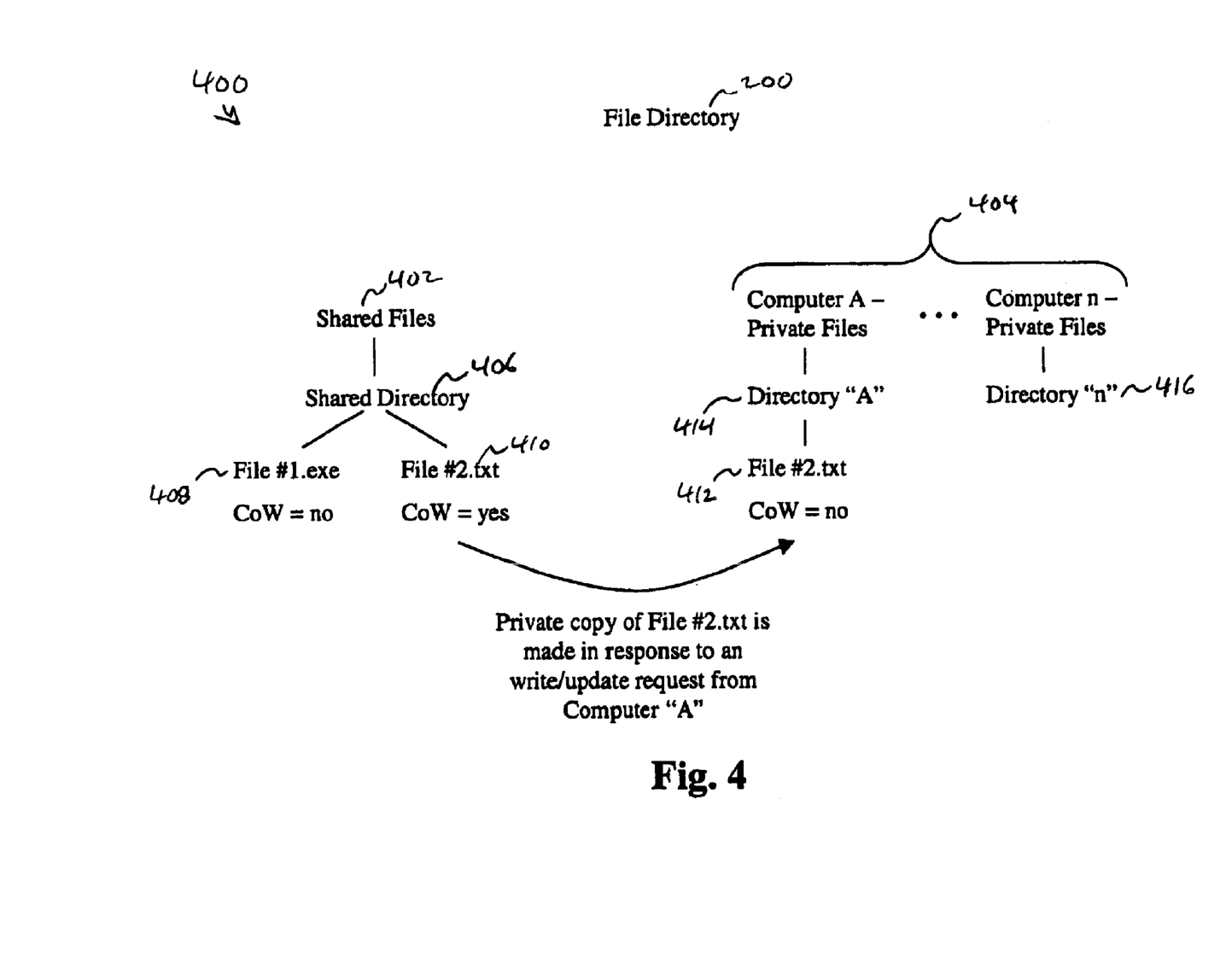
FIG. 4 is a file tree showing an example of a set of shared and private files within the file directory.

FIG. 4 is a file tree showing an example 400 of a set of shared files 402 and a set of private files 404 within the file directory 200. In the example 400, the shared files 402 under a shared directory 406 are File #1.exe 408 and File #2.txt 410. As expected, a CoW property for the .exe type File #1 is set to "no," since it's very unlikely that a cluster computer would request write/update access to such a file; however, in some other embodiments of the present invention, the CoW property for .exe files could also be set to a default "yes" state. Such an alternate embodiment would have little harmful effect, apart from consuming some amount of disk space, should the .exe file be accidentally opened for write access and a private copy made.

File #2 however is a .txt file, having a CoW property set to "yes." This is most likely because File #2 is to be customized by whichever cluster computer needs access to it. In the example 400 shown, computer "A" 102 has requested write/update access to File #2. Since File #2's CoW property is set to "yes," a copy 412 of File #2 has been stored in computer A's private file area within the storage device 114, under directory "A" 414. The CoW property for this copy 412 is set to "no," by the method 300 of the present invention. Computer "n" 106, in this example 400, shows no copied files under its directory "n" 416, since computer "n," 106 has not yet requested write/update access to File #2.txt 410.

The present invention simplifies application program installation, since private files are automatically created as needed during program execution, saving software developers and system administrators considerable time since they do not need to explicitly identify the private files either prior to installation or during program execution. Instead the present invention automatically and dynamically either maintains a read/execute only shared copy or duplicates certain write-accessible files, depending upon how an application programs attempts to access such files over a network.

While one or more embodiments of the present invention have been described, those skilled in the art will recognize that various modifications may be made. Variations upon and modifications to these embodiments are provided by the present invention, which is limited only by the following claims.

What is claimed is:

1. A method for file differentiation, comprising:
   receiving a request from a computer for access to a shared file;
   providing the computer with access to a computer specific private copy of the shared file, if the private copy already exists; and
   creating the computer specific private copy of the shared file for the computer to access, if the private copy does not already exist and if write access to the shared file is requested; and
   wherein,
   receiving includes,
      receiving a request from a first computer for access to the shared file; and
      receiving a request from a second computer for access to the shared file;
   providing includes,
      providing the first computer with access to a first computer specific private copy of the shared file, if the first private copy already exists; and
      providing the second computer with access to a second computer specific private copy of the shared file, if the second private copy already exists; and
   creating includes,
      creating the first computer specific private copy of the shared file for the first computer to access, if the first private copy does not already exist and if write access to the shared file is requested; and
      creating the second computer specific private copy of the shared file for the second computer to access, if the second private copy does not already exist and if write access to the shared file is requested.

2. The method of claim 1 further comprising:
   providing the computer with access to the shared file, if the private copy does not already exist and if read access to the shared file is requested.

3. The method of claim 1 further comprising:
   providing the computer with access to the shared file, if the private copy does not already exist and if execute access to the shared file is requested.

4. The method of claim 1:
   further comprising, attributing a Copy-on-Write (CoW) property to the shared file; and
   wherein creating further includes creating the computer specific private copy of the shared file for the computer to access, if CoW property is set to an affirmative state.

5. The method of claim 4 further comprising:
   attributing the CoW property to the computer specific private copy; and
   setting the CoW property for the computer specific private copy to a negative state.

6. The method of claim 1 further comprising:
setting the CoW property for the shared file to an affirmative state by default, before the receiving.

7. The method of claim 1, further comprising:
attributing a private-copy-made property to the shared file;
searching for the computer specific private copy of the shared file in a private file area reserved for the computer, if the private-copy-made property is set to an affirmative state; and
skipping the searching if the private-copy-made property is set to a negative state.

8. The method of claim 7:
further including, storing the shared file in a shared file area;
wherein receiving includes,
 receiving a request from a first computer for access to the shared file; and
 receiving a request from a second computer for access to the shared file;
wherein searching includes,
 searching for a first computer specific private copy of the shared file in a first private file area reserved for the first computer; and
 searching for a second computer specific private copy of the shared file in a second private file area reserved for the second computer.

9. The method of claim 1 wherein receiving includes:
receiving a request from a computer for access to a shared application program file.

10. The method of claim 1 wherein receiving includes:
receiving a request from a computer for access to a shared file from a set of shared files stored within a shared file area.

11. A method for file differentiation, comprising:
attributing a Copy-on-Write (CoW) property to a shared file;
receiving a request from a first computer for access to the shared file;
receiving a request from a second computer for access to the shared file;
providing the first computer with access to a first computer specific private copy of the shared file, if the first private copy already exists;
providing the second computer with access to a second computer specific private copy of the shared file, if the second private copy already exists;
creating the first computer specific private copy of the shared file for the first computer to access, if the first private copy does not already exist, write access to the shared file is requested, and the CoW property is set to an affirmative state;
creating the second computer specific private copy of the shared file for the second computer to access, if the second private copy does not already exist, write access to the shared file is requested, and the CoW property is set to an affirmative state;
providing the computers with access to the shared file respectively, if the private copies respectively do not already exist and if read access to the shared file is requested; and
providing the computers with access to the shared file respectively, if the private copies respectively do not already exist and if execute access to the shared file is requested.

12. A computer-usable medium embodying computer program code for commanding a computer to effect file differentiation, comprising:
receiving a request from a computer for access to a shared file;
providing the computer with access to a computer specific private copy of the shared file, if the private copy already exists; and
creating the computer specific private copy of the shared file for the computer to access, if the private copy does not already exist and if write access to the shared file is requested; and
wherein,
receiving includes,
 receiving a request from a first computer for access to the shared file; and
 receiving a request from a second computer for access to the shared file;
providing includes,
 providing the first computer with access to a first computer specific private copy of the shared file, if the first private copy already exists; and
 providing the second computer with access to a second computer specific private copy of the shared file, if the second private copy already exists; and
creating includes,
 creating the first computer specific private copy of the shared file for the first computer to access, if the first private copy does not already exist and if write access to the shared file is requested; and
 creating the second computer specific private copy of the shared file for the second computer to access, if the second private copy does not already exist and if write access to the shared file is requested.

13. The medium of claim 12 further comprising:
providing the computer with access to the shared file, if the private copy does not already exist and if read access to the shared file is requested.

14. The medium of claim 12 further comprising:
providing the computer with access to the shared file, if the private copy does not already exist and if execute access to the shared file is requested.

15. The medium of claim 12:
further comprising, attributing a Copy-on-Write (CoW) property to the shared file; and
wherein creating further includes creating the computer specific private copy of the shared file for the computer to access, if CoW property is set to an affirmative state.

16. The medium of claim 12, further comprising:
attributing a private-copy-made property to the shared file;
searching for the computer specific private copy of the shared file in a private file area reserved for the computer, if the private-copy-made property is set to an affirmative state; and
skipping searching if the private-copy-made property is set to a negative state.

17. A system for file differentiation, comprising:
means for receiving a request from a computer for access to a shared file;
means for providing the computer with access to a computer specific private copy of the shared file, if the private copy already exists; and
means for creating the computer specific private copy of the shared file for the computer to access, if the private copy does not already exist and if write access to the shared file is requested; and wherein, means for receiving includes,
   means for receiving a request from a first computer for access to the shared file; and
   means for receiving a request from a second computer for access to the shared file;

means for providing includes,
   means for providing the first computer with access to a first computer specific private copy of the shared file, if the first private copy already exists; and
   means for providing the second computer with access to a second computer specific private copy of the shared file, if the second private copy already exists; and means for creating includes,
   means for creating the first computer specific private copy of the shared file for the first computer to access, if the first private copy does not already exist and if write access to the shared file is requested; and
   means for creating the second computer specific private copy of the shared file for the second computer to access, if the second private copy does not already exist and if write access to the shared file is requested.

18. The system of claim 17 further comprising:

means for providing the computer with access to the shared file, if the private copy does not already exist and if read access to the shared file is requested.

19. The system of claim 17 further comprising:

means for providing the computer with access to the shared file, if the private copy does not already exist and if execute access to the shared file is requested.

20. The system of claim 17:

further comprising, means for attributing a Copy-on-Write (CoW) property to the shared file; and wherein the means for creating further includes means for creating the computer specific private copy of the shared file for the computer to access, if CoW property is set to an affirmative state.

21. A method for file differentiation, comprising:

receiving a request from a computer for access to a shared file;

providing the computer with access to a computer specific private copy of the shared file, if the private copy already exists;

creating the computer specific private copy of the shared file for the computer to access, if the private copy does not already exist and if write access to the shared file is requested;

attributing a Copy-on-Write (CoW) property to the shared file;

attributing the CoW property to the computer specific private copy; and setting the CoW property for the computer specific private copy to a negative state; and wherein creating further includes creating the computer specific private copy of the shared file for the computer to access, if CoW property is set to an affirmative state.

22. A method for file differentiation, comprising:

receiving a request from a computer for access to a shared file;

providing the computer with access to a computer specific private copy of the shared file, if the private copy already exists;

creating the computer specific private copy of the shared file for the computer to access, if the private copy does not already exist and if write access to the shared file is requested;

attributing a private-copy-made property to the shared file;

searching for the computer specific private copy of the shared file in a private file area reserved for the computer, if the private-copy-made property is set to an affirmative state; and skipping the searching if the private-copy-made property is set to a negative state.

23. The method of claim 22:

further including, storing the shared file in a shared file area;

wherein receiving includes,
   receiving a request from a first computer for access to the shared file; and
   receiving a request from a second computer for access to the shared file;

wherein searching includes,
   searching for a first computer specific private copy of the shared file in a first private file area reserved for the first computer; and
   searching for a second computer specific private copy of the shared file in a second private file area reserved for the second computer.

24. A computer-usable medium embodying computer program code for commanding a computer to effect file differentiation, comprising:

receiving a request from a computer for access to a shared file;

providing the computer with access to a computer specific private copy of the shared file, if the private copy already exists;

creating the computer specific private copy of the shared file for the computer to access, if the private copy does not already exist and if write access to the shared file is requested;

attributing a private-copy-made property to the shared file;

searching for the computer specific private copy of the shared file in a private file area reserved for the computer, if the private-copy-made property is set to an affirmative state; and skipping searching if the private-copy-made property is set to a negative state.

* * * * *